Jan. 5, 1932. W. SCHÄFFER 1,839,442
HARMONICS CONTROL
Filed Dec. 28, 1926
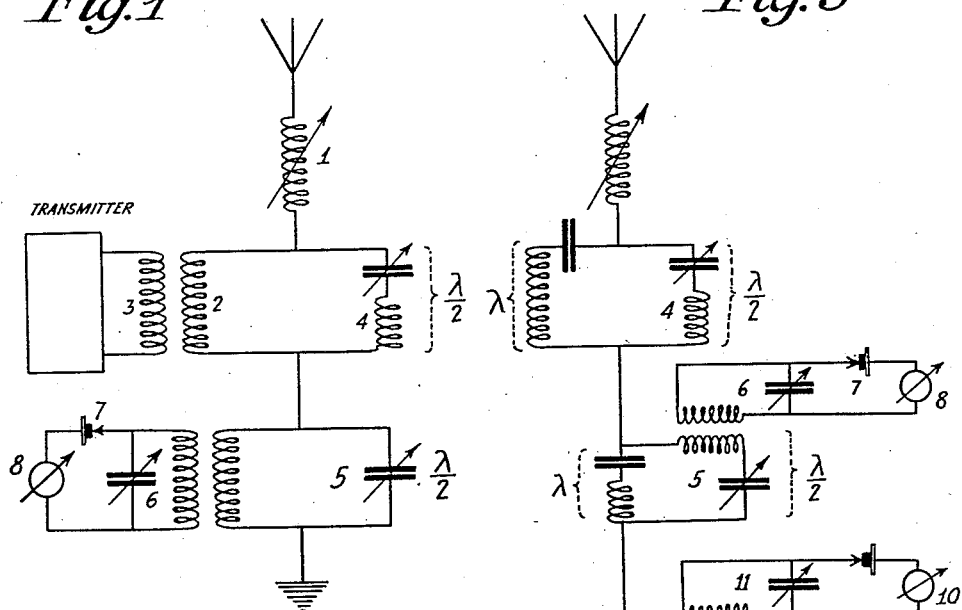
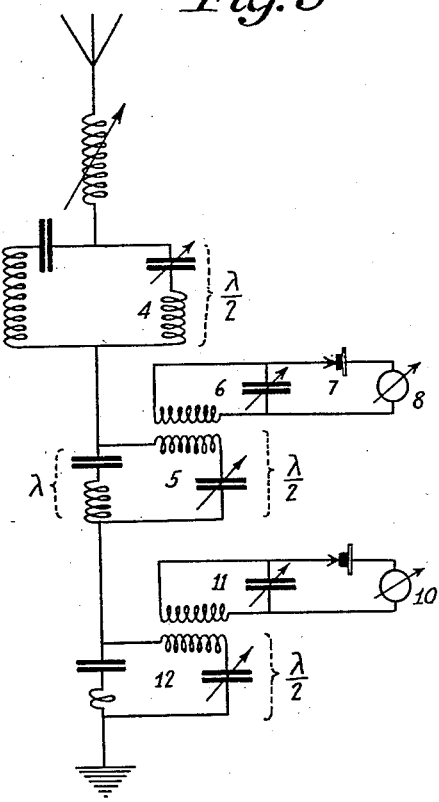
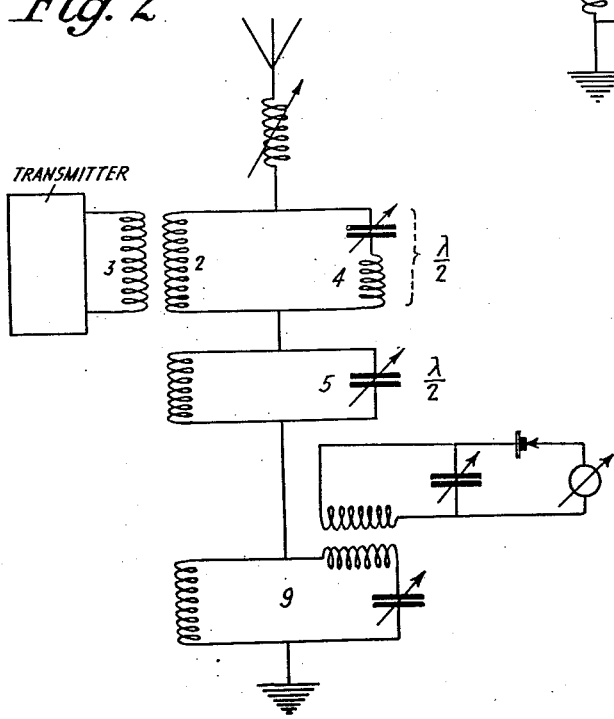
INVENTOR
WALTER SCHAFFER
BY
ATTORNEY Patented Jan. 5, 1932

1,839,442

UNITED STATES PATENT OFFICE

WALTER SCHÄFFER, OF BERLIN, GERMANY, ASSIGNOR TO RADIO CORPORATION OF AMERICA, A CORPORATION OF DELAWARE

HARMONIC CONTROL

Application filed December 28, 1926, Serial No. 157,454, and in Germany April 8, 1926.

This invention relates to the control of harmonics, and more particularly to the advantageous use of indicating instruments to secure the best possible control.

It is an object of my invention to preclude harmonics from radiating from an antenna.

It is a further object of my invention to provide syntonizable circuits to this end, and to couple these to the antenna circuit in a novel and advantageous manner.

It is a still further object of my invention to provide indicating instruments by the aid of which the syntonizable circuits may be tuned for best results.

In the operation of transmitters it is undesirable to radiate harmonics or stray waves together with the fundamental wave. Indeed, it is extremely desirable to suppress them. One way of accomplishing this is to provide short-circuit paths, in parallel to the antenna coupling, consisting of series combinations, that is, condensers and coils tuned to the harmonics; or else rejector circuits which are tuned to the wave to be suppressed may be inserted in the antenna itself. What is needed, especially in the case of series structures connected in parallel with the coupling coil, is a proper criterion whereby to judge the correct tuning of the said means during operation. Now, the present invention discloses means and ways adapted to measure the said harmonics and to constantly supervise or control them during operations. Measurement may be effected by directly filtering the harmonics out of the auxiliary circuits described, and then measuring them; or, better, by having in the antenna separate measuring circuits for the harmonics. In many cases, couplings can be used such that for energy of the fundamental frequency the coupling is loose and for the harmonic to be eliminated the coupling is rather close. Preferably a combination of the two measuring methods may be employed.

The drawings, by way of example, show several ways in which the control circuits may be coupled.

Fig. 1 is a simple form of circuit including my invention.

Fig. 2 is a modification including a special coupling circuit for the measuring circuit.

Fig. 3 is a modification using series resonant coupling circuits.

Fig. 1 shows the antenna with a wave lengthening variometer, 1, and a coupler coil 2 which may be coupled with the coupling coil 3 of a transmitter. To suppress a harmonic, a series circuit 4 comprising a condenser and self-inductance is provided in parallel with the coupling coil 2, said circuit being tuned to a harmonic, for instance $\lambda/2$. In addition to, or instead of, the said series circuit, a stopper circuit 5 could be inserted in the antenna which may be tuned to the said harmonic. Now, in order that the tuning of the circuit 4 or circuit 5 may be correctly effected during operation, measuring means are provided in conformity with this invention, which, for instance, consist of a tuned circuit 6 with which a galvanometer 8 is connected by way of a detector 7. The instrument 8 will indicate maximum deflection, as a function of the tuning of circuit 5, if the circuit 5 is correctly tuned, and it will show a smaller maximum deflection at the instant when the structure 4 is properly tuned.

However, in many cases it is not quite easy to filter out the harmonic, which is to be measured and controlled from the far stronger fundamental wave by the aid of circuit 6. This can be accomplished more easily by the provision of a separate measuring circuit 9 as is indicated in Fig. 2 of the drawings. The coupling of the circuit 9 to the antenna circuit is considerably looser than that of circuit 5. With the type of coupling shown this is done simply by using few turns in the inductance which is in series with the antenna circuit. Indeed, it may be made much looser on the ground that circuit 9 does not serve the object of substantially suppressing the harmonic in the antenna. It is known that the circuit which is intended to suppress the harmonic, must be coupled with the antenna relatively closely. The main purpose of circuit 9, indeed, is to measure only the harmonic, and the coupling distinguishes itself from that of circuit 5 by that only a small part of the self-inductance of circuit 9 is contained in the antenna.

In Fig. 3, the coupling of the series structure 4 as well as that of the stopper circuit 5 with the antenna is effected in such a way that the coupling for the fundamental wave is especially loose, while the coupling for the harmonic may be as close as may be desired. This end is attained by coupling the circuit with the antenna at points across which there exists practically no potential difference for the frequency of the fundamental wave. This is attained by the use of series resonant structures tuned to the fundamental wave. It will be evident that a similar coupling may be used to advantage for the measuring circuit also. Since circuit 5, in this arrangement, may be coupled to the antenna by means of a comparatively high self-inductance, a self-inductance may be provided in addition to the coupling inductance; and with the said self-inductance a measuring circuit may be coupled. In an arrangement of this sort, measuring instrument 8 of measuring circuit 6 will indicate a maximum whenever the tuning of circuit 5 is set accurately. It will indicate a minimum maximum when circuit 4 is tuned properly, for the circuit 4 will bypass most of the harmonic in the first instance. A coupling circuit 12 and measuring circuit 11 with an additional instrument 10 may be used. Instrument 10, will show minimum deflection in case of proper tuning of circuit 5.

Adjustment during operations is effected in the following manner: In detuned condition of circuit 5 comprised in the arrangement, instrument 10 will show a relatively large deflection, of course, under the assumption that circuits 11 and 12 are tuned to the harmonic to be suppressed. By tuning circuit 5, the deflection of instrument 10 will decrease, while at the same time the deflection of instrument 8 will grow. By further tuning of structure 4, the deflection will fall off both in instrument 8 as well as in instrument 10. This is the desired operating condition.

In Figs. 1, 2, and 3, arrangements were shown in which only the first harmonic was to be suppressed. It goes without saying that, in addition to these means, others may be connected with the same antenna for the elimination of other harmonics. However, for measuring purposes, only one circuit 12 with the auxiliary circuit 11 and instrument 10 are used. The same is tuned to each harmonic to be suppressed by suitable setting of the circuit condensers. After adjustment to all harmonics has been effected, circuits 11 and 12 remain adjusted to any desired harmonic. As long as the fundamental wave of the antenna is not subject to alterations, correct indication of one of the harmonics holds true also for all of the others.

The ways and means hereinbefore described are preferable because of their great simplicity.

What I claim is:

1. In combination, an antenna circuit tuned to a fundamental frequency, a source of energy, means to couple the antenna circuit and said source including inductance of a series resonant circuit tuned to the fundamental frequency, another series resonant circuit connected in parallel with the aforesaid resonant circuit and adapted to be tuned to a harmonic frequency, a parallel resonant circuit one branch of which is in series resonance for the fundamental frequency connected in the antenna circuit, said parallel resonant circuit being adapted to be tuned to a harmonic frequency, and indicating means to determine when said adjustable series and parallel resonant circuits are tuned to a harmonic.

2. In combination, an antenna circuit tuned to a fundamental frequency, a source of energy, means to couple said antenna circuit and said source including inductance of a series resonant circuit tuned to the fundamental frequency, another series resonant circuit connected in parallel with the aforesaid resonant circuit and adapted to be tuned to a harmonic frequency, indicating means to determine when the second resonant circuit is tuned to the harmonic, a parallel resonant circuit one branch of which is in series resonance for the fundamental frequency connected in the antenna circuit, said parallel resonant circuit being adapted to be tuned to a harmonic frequency, and another indicating means to determine when said parallel resonant circuit is tuned to the harmonic.

3. In combination, an antenna circuit tuned to a fundamental frequency, a source of energy coupled thereto, a parallel resonant circuit adapted to be tuned to a harmonic frequency connected in said antenna circuit, one of the branches of said parallel resonant circuit being in series resonance for the fundamental frequency, another resonant circuit tuned to the harmonic, and indicating means coupled to the latter resonant circuit.

4. In combination, an antenna circuit tuned to a fundamental frequency, a source of energy, means to couple the antenna circuit and said source including inductance of a series resonant circuit tuned to the fundamental frequency, another series resonant circuit connected in parallel with the aforesaid resonant circuit and adapted to be tuned to a harmonic frequency, a parallel resonant circuit one branch of which is in series resonance for the fundamental frequency connected in the antenna circuit, said parallel resonant circuit being adapted to be tuned to a harmonic frequency, another resonant circuit tuned to the harmonic frequency, and indicating means coupled to the last said circuit.

5. The method of adjusting syntonizable series resonant by-pass and parallel resonant blocking circuits for controlling the flow of harmonics in a circuit carrying energy of a fundamental frequency comprising the step of measuring the magnitude of the harmonics flow in the parallel resonant circuit and adjusting the parallel resonant circuit for a maximum indication, and adjusting the series resonant circuit in accordance with the observed measurement for minimum indication.

WALTER SCHÄFFER.